Aug. 2, 1966 J. H. GIOVANAZZI ETAL 3,264,012
TUBE COUPLING
Filed Aug. 11, 1961

INVENTOR.
JOHN H. GIOVANAZZI &
DONALD F. COLLINS
BY Oberlin, Maky & Donnelly
ATTORNEYS

United States Patent Office 3,264,012
Patented August 2, 1966

3,264,012
TUBE COUPLING
John H. Giovanazzi, Los Angeles, and Donald F. Collins, Pacific Palisades, Calif., assignors to Parker-Hannifin Corporation, Cleveland, Ohio, a corporation of Ohio
Filed Aug. 11, 1961, Ser. No. 130,878
2 Claims. (Cl. 285—22)

The present invention relates generally to couplings for tubes and more particularly to couplings wherein the tube is connected to a coupling part by brazing or the like and such coupling part is connected to another coupling part, one of the parts having a flexible metal sealing element engageable with the other part to provide a pressure sensitive seal therebetween.

The invention has been developed particularly for installations requiring a very high degree of reliability and effectiveness, such as in fueling and control systems of rocket and missile propulsion equipment. It advances the state of the art for both brazed tube coupling joints and mechanically sealed tube coupling joints.

In making tubing installations a great deal depends upon the care and skill used in assembling the joints as well as in the design and workmanship involved in making the parts. It is an object of the present invention to attain a high degree of reliability in the finished installation. The present invention seeks to attain this object by providing a coupling in which the brazing operation is facilitated and in which means is provided for facilitating inspection of the brazed joint.

Another object is to provide a tube coupling of the character indicated in which the coupling parts that are to be joined and mechanically sealed against each other have a minimum of entry one within the other, and wherein the axial travel of the members to make a fluid-tight joint is a minimum thereby avoiding assembly and disassembly strains on the tubes.

It is another object of this invention to provide a novel coupling construction wherein the coupling members are fuse-bonded, as by brazing or like expedient, to the respective tubes without affecting the temper of the mutually interengaging sealing portions thereof.

It is another object of this invention to provide a low torque coupling, whereby coupling members need only be turned a fraction of a turn and at low torque in order to to effect a strong fluid-tight connection.

It is another object of this invention to provide a novel form of fluid-tight joint between the coupling members.

It is another object to provide a tube coupling in which the tube is brazed or otherwise fuse-bonded to a coupling member and means is provided at both ends of the member for centering the tube therein to provide a uniform clearance space to receive the braze metal whereby proper brazing is facilitated.

It is another object, in a coupling of the type in which a coupling member has an internal groove for containing braze metal which may be heated to cause the braze metal to flow within a small clearance between the tube and member, to form the groove edges in such a manner as to facilitate flow of braze metal from such groove to said clearance.

It is another object to provide a braze type tube coupling in which the braze metal is initially contained within an internal groove of a coupling member and such member has openings through which the joint may be visually inspected for proper brazing, the edges of the opening being formed to permit flow of braze material in a manner to facilitate such inspection.

It is another object to provide a coupling in which a free end of a thin flexible lip on one coupling member engages with and is resiliently deformed by a tapered seat in another coupling member, the cross section of said lip where it engages said seat being curved with the center of said curvature being between the ends of said lip and closely adjacent the end thereof opposite the free end whereby the lip may be of minimum length with maximum flexibility yet at the same time assure line contact at all times with said tapered seat for effective sealing.

Other objects and advantages of the present invention will become apparaent as the following description proceeds.

To the accomplishment of the foregoing and related ends, the invention, then comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

Figure 1:
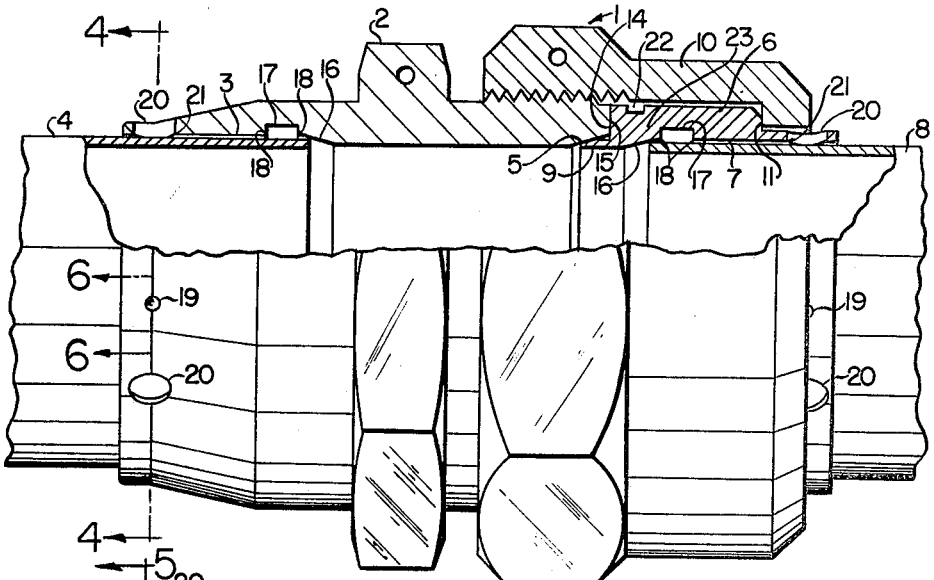
FIG. 1 is a side elevation view, partly in section, showing the union in its assembled condition.

Referring now more particularly to the drawings, and first to FIG. 1, the tube coupling or union 1 herein, comprises the female coupling part 2 which, as shown by the reference numeral 3, is brazer or otherwise secured on the end of one tube 4, the female part terminating at its end in an internal frusto-conical seat 5. The male coupling part 6 similarly is brazed or otherwise secured, as at 7, on the end of another tube 8, said male coupling part 6 having a tubular lip 9 at its end which is adapted to make resilient fluid-tight engagement with the seat 5 in the female coupling part 2. These parts 2 and 6 are drawn together into fluid-tight engagement as by means of the nut 10 which engages a shoulder 11 of the male coupling part 6 and which has threaded engagement with the female coupling part 2.

With reference to the fluid-tight joint between the female and male coupling parts 2 and 6, superior results have been obtained by having the female seat 5 of the frusto-conical form of about 30° apex angle, and by making the lip 9 of progressively decreasing cross-section with an exterior toroidal surface 12, the latter being on a radius whose center is between the axial ends of the lip 9 and is closely adjacent the end opposite the free end of the lip, namely on the order of .010" from the end of lip 9 where it merges with the remainder of sleeve 6. With this configuration lip 9 may be of minimum length and maximum flexibility yet at the same time accord line contact at all times with seat 5, curved surface 12 being tangent to the largest diameter of the lip to leave a cylindrical portion 12a of about .010" width.

Figure 3:
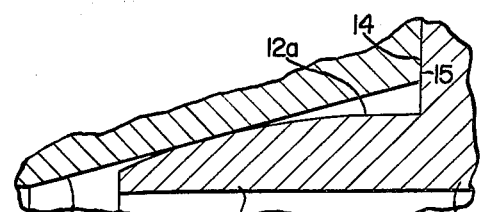
FIG. 3 is a similar much enlarged radial cross-section view showing the joint in its fully tightened condition with the coupling parts in fluid-tight engagement.
Figure 2:
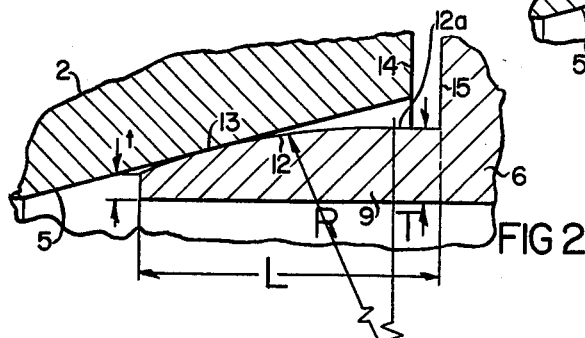
FIG. 2 is a much enlarged radial cross-section view showing the condition of the coupling parts in finger-tight condition.
Figure 6:
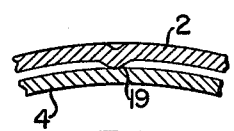
FIG. 6 is an enlarged partial cross section along the lines 6—6 of FIG. 1.
Figure 5:
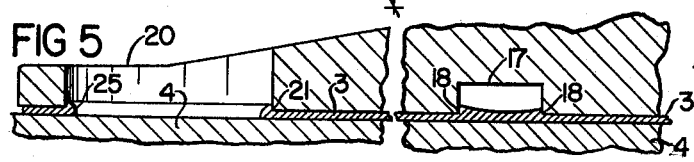
FIG. 5 is a cross-section view taken sustantially along the line 5—5, FIG. 4.

As best shown in FIG. 2, the lip 9 is initially in line contact 13 with seat 5 closely adjacent the free end of the lip 9 and when the coupling parts 2 and 6 are drawn together by turning of the nut 10, the surfaces 14 and 15 of the respective female and male coupling parts 2 and 6 will abut to serve as a positive stop means. The initial distance between faces 14 and 15 in FIG. 2 is slight that they come together before the elastic limit of the lip 9 is exceeded. The lip 9 is thereby resiliently deformed as shown in FIG. 3, to provide a fluid-tight joint and, in addition, fluid under pressure inside the relatively thin and flexibility lip 9 with assist in maintaining the fluid-tight seal with the seat 5. The thinness of the lip further facilitates such flexibility and response to fluid pressure for maintaining a tight seal, the maximum thickness being, for example, on the order of 1/16" for couplings for 1/4" O.D. tube and 3/64" for couplings for 2" O.D. tube.

In couplings of this nature, when the coupling parts 2 and 6 are made of corrosion resisting alloy, such as AM 355 produced by Allegheny-Ludlum Co., best results are obtained by maintaining a ratio of L:T of approximately 4:1 with the thickness $t$ of the lip 9 at its free end being about T/3 to T/2. In couplings for tubes ranging from 3/16" to 2" diameter, the thickness T of the lip 9 should be from about 0.016" in a coupling for 1/4" O.D. tube to about 0.040" in a coupling for 2" O.D. tube and the corresponding length L from about 0.060" to about 0.160".

Insofar as the connections of the respective tubes 4 and 8 with the respective female and male coupling parts 2 and 6, these are preferably substantially identical, there being provided tapered seats 16 which center the ends of the respective tubes. Adjacent each tube seat 16 is an internal groove 17 for containing a ring of brazing material, it having been found imperative to maintain sharp corners 18, that is, on the order of .003" maximum radius, so that when the coupling parts 2 and 6 are heated, as by induction coils therearound (not shown), the melted brazing material will, by capillary action, flow axially in opposite directions between the coupling parts 2 and 6 and the respective tubes 4 and 8. With such sharp edges the melting braze material within groove 17 is readily drawn into the capillary space between coupling parts 2 and 6 and tubes 4 and 8. If the edges are chamfered or rounded to a greater extent there is difficulty in getting the capillary flow started, or at least in obtaining uniform flow and fill.

Figure 4:
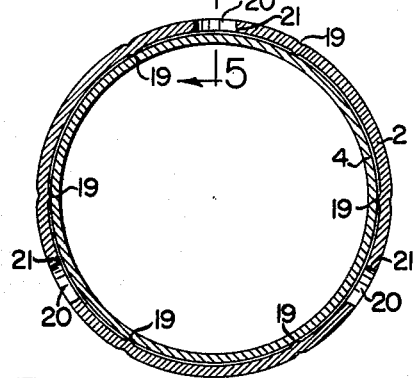
FIG. 4 is a transverse cross-section view taken along line 4—4, FIG. 1 showing the dimpled tube-centering portion of one of the coupling parts.

In order to maintain a uniform radial clearance between the coupling parts 2 and 6 and the respective tubes 4 and 8, so as to insure complete fill and uniform flow of braze material, the axially outer end portions of the coupling parts 2 and 6 are formed with a series of three or more dimples 19 as best shown in FIG. 4, which are adapted to engage the outer surfaces of the tubes, whereby, together with the tube seats 16, the radial clearance between the coupling parts 2 and 6 and the tubes 4 and 8 is maintained substantially uniform for desired capillary flow of the brazing material as aforesaid. In order to determine that the brazing material 3 and 7 has made a proper connection of the coupling parts 2 and 6 on the tubes 4 and 8, there are provided adjacent the axially outer ends of the coupling parts, a series of inspection holes 20 which again must have sharp inner edges 21 of about .003" maximum radius or chamfer for flow of the brazing material to the ends of the coupling parts. Accordingly, when the brazing operation has been completed, an inspector can, by looking in the holes 20, determine at once whether or not the brazing material has properly filled the radial space between the respective coupling parts and tubes. With sharp edges 21 as described the braze material is drawn up to the very edge of the holes 20 and slightly beyond so as to form a bead 25 projecting into holes 20, this bead being clearly visible through the holes. If edges 21 are chamfered or rounded to a greater extent the braze material flows only part way into the chamfer or rounded space and cannot be readily seen through holes 20. Good results are obtained when the diameters of the inspection holes 20 range from 1/16" in couplings for 3/16" diameter tubes to 3/16" for couplings for 2" diameter tubes.

In the case of the female coupling part 2, the brazing operation has no effect on the heat treatment or temper of the seat 5 owing to the relatively great distance of the seat 5 from the tube connection 3 and to the relatively large mass of metal therebetween. However, in the case of the male coupling part 6, the brazing operation is conducted near the tempered or otherwise heat-treated lip 9 and, therefore, said part 6 is formed with a peripheral, sharp-cornered groove 22 between the lip 9 and the brazing ring groove 17 to provide a restriction 23 which has been found to greatly discourage heat flow toward the lip 9. When the coupling part 6 is heated to perform the brazing operation, the heat flow will be principally in an axially outward direction away from the tubular lip 9, whereby the thin tubular lip 9 retains its original temper or heat treatment. Good results are obtained when the heat-flow restrictor grooves 22 range from about 0.025" to about 0.062" radial depth and from about 0.035" to 0.094" axial width on couplings for 3/16" to 2" O.D. tube respectively.

Other modes of applying the principle of the invention may be employed, change being made as regards the details described, provided the features stated in any of the following claims, or the equivalent of such, be employed.

We therefore, particularly point out and distinctly claim as invention:

1. A tube coupling comprising interengaged male and female tubular coupling parts, of which said male part has a bore for receipt for a tube therein for fuse-bonding together of said male part and the tube; said bore having a tapered tube-end centering seat, and a circumferential series of radial inward projection means axially spaced a substantial distance from such tube-end centering seat for non-biting engagement with the outer surface of the tube to maintain a uniform radial clearance between the tube and the bore for flow of bonding material from the end of the tube at least to said projections; and means for clamping said parts together in fluid-tight relation; said male part comprising a body portion from the axially inner end of which projects a relatively thin axial lip of axial length about four times its maximum thickness at the junction with said male part, of substantially uniform inside diameter, and of progressively decreasing radial thickness toward its free end with its outer face being a portion of a torus, said axial lip defining an axially inwardly extending heat sensitive sealing means of a cross-sectional thickness considerably less than the given cross-sectional thickness of said body portion, said body portion being divided by a peripheral groove formed adjacent the axially inner end of the tube-end receiving bore into adjacent body sections having susbtantial cross-sectional areas, said groove providing an area of reduced cross-section which separates said adjacent body sections and forms a restriction which reduces the flow of heat in a direction axially away from said groove toward said sealing means during the bonding operation; said female part having a tapered seat against which the outer face of said lip at a zone close to said free end which is tangent to said tapered seat is axially pressed and thereby radially inwardly flexed to establish a resilient fluid-tight connection between said parts, said parts having abutting stop shoulders to limit deformation of said lip within its elastic limit when said parts are clamped together.

2. A tube coupling comprising interengaged male and female tubular coupling parts, of which one is fuse-bonded on the end portion of a tube; and means for clamping said parts together in fluid-tight relation; said one part comprising a body portion and a sealing portion, said body portion being of a given cross-sectional thickness and defining an axially outwardly opening tube-end receiving bore within which the tube-end is fused-bonded, said sealing portion being adjacent the axially inner end of said body portion and defining an axially inwardly extending heat sensitive sealing means of a cross-sectional thickness considerably less than the given cross-sectional thickness of the body portion, said body portion being divided by a peripheral groove formed adjacent the axially inner end of the tube-end receiving bore into adjacent body section having substantial cross-sectional areas, said groove providing an area of reduced cross-section which separates said adjacent body sections and forms a restriction which reduces the flow of heat in a direction axially away from said groove toward said sealing portion during the bonding operation.

References Cited by the Examiner

UNITED STATES PATENTS

| | | | |
|---|---|---|---|
| 951,704 | 3/1910 | Schmidt | 285—334.4 |
| 1,901,820 | 3/1933 | Parker | 285—287 |
| 2,329,956 | 9/1943 | Taylor | 285—287 |
| 2,335,040 | 11/1943 | Bruno | 285—287 |
| 2,473,120 | 6/1949 | Wolfram | 285—334.1 |
| 2,502,399 | 3/1950 | Greeff | 285—187 |
| 2,633,374 | 3/1953 | Boice | 285—175 X |
| 2,888,783 | 6/1959 | Turnbull | 285—287 |
| 3,069,187 | 12/1962 | Collins | 285—110 |

FOREIGN PATENTS 496,396  11/1938  Great Britain.

CARL W. TOMLIN, *Primary Examiner.*

S. R. MILLER, D. W. AROLA, *Assistant Examiners.*